(12) United States Patent
Otani et al.

(10) Patent No.: US 9,189,198 B2
(45) Date of Patent: Nov. 17, 2015

(54) DATA SIMILARITY CALCULATION METHOD AND DATA SIMILARITY CALCULATION APPARATUS

(71) Applicant: YOKOGAWA ELECTRIC CORPORATION, Musashino-shi, Tokyo (JP)

(72) Inventors: Tetsuya Otani, Musashino (JP);
Tomohiro Kuroda, Musashino (JP);
Hidehiko Wada, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 315 days.

(21) Appl. No.: 13/972,218

(22) Filed: Aug. 21, 2013

(65) Prior Publication Data

US 2014/0059098 A1 Feb. 27, 2014

(30) Foreign Application Priority Data

Aug. 22, 2012 (JP) ................................. 2012-183089

(51) Int. Cl.
*G06F 7/00* (2006.01)
*G06F 5/01* (2006.01)
*G06F 17/18* (2006.01)
*G06K 9/62* (2006.01)

(52) U.S. Cl.
CPC ............ *G06F 5/01* (2013.01); *G06F 17/18* (2013.01); *G06K 9/6203* (2013.01)

(58) Field of Classification Search
None
See application file for complete search history.

(56) References Cited

U.S. PATENT DOCUMENTS

| 2002/0044691 A1* | 4/2002 | Matsugu .................... 382/218 |
| 2012/0194652 A1* | 8/2012 | Myokan et al. ............. 348/50 |
| 2014/0059098 A1* | 2/2014 | Otani et al. ................. 708/209 |

FOREIGN PATENT DOCUMENTS

| JP | 5-204982 A | 8/1993 |
| JP | 05-204991 A | 8/1993 |
| JP | 6-274193 A | 9/1994 |
| JP | 2004-078812 A | 3/2004 |
| JP | 2004-348594 A | 12/2004 |
| JP | 2009-048562 A | 3/2009 |

OTHER PUBLICATIONS

Kassidas, et al., "Synchronization of Batch Trajectories Using Dynamic Time Warping", Process Systems Engineering, AIChE Journal, vol. 44, No. 4, Apr. 1998, pp. 864-875.

(Continued)

*Primary Examiner* — David H Malzahn
(74) *Attorney, Agent, or Firm* — Sughrue Mion, PLLC

(57) ABSTRACT

There is provided a data similarity calculation method. The method includes: (a) acquiring a first waveform; (b) storing time series data; (c) converting the stored time series data into a waveform on two-dimensional coordinates, wherein the two-dimensional coordinates consists of a time axis and an a value axis representing values of the time series data, and the time axis is orthogonal to the value axis; (d) shifting the converted waveform in both directions of the time axis and the value axis so as to generate a second waveform; (e) calculating a similarity between the first waveform and the second waveform; and (f) extracting a shift amount in the direction of the time axis and a shift amount in the direction of the value axis when the similarity is the highest by repeatedly performing steps (d) and (e).

9 Claims, 6 Drawing Sheets

(56) References Cited

OTHER PUBLICATIONS

Diantono, et al., "Information Retrieval for Intelligent Information Integration in Nuclear Power Plant", Journal of Atomic Energy Society, vol. 42, No. 11, 2000, pp. 1215-1225.
Fujino, et al., "A Method for Similarity-Based Search of Time Series Sensor Data", Proceeding of FIT2009, 2009, pp. 295-296.
Fujino, et al., "DIASTRA: A Method for the Similarity Traversals of Time-Series Data", DEIM Forum 2011 D9-4, 2011, 6 pgs total.
Nakamura, et al., "AMSS: A Similarity Measure for Time Series Data", IEICE Transactions, J91-D(11), 2008, pp. 2579-2588.
Ada Wai-chee Fu, et al., "Scaling and Time Warping in Time Series Querying", Proceedings of the 31st VLDB Conference, Trondheim, Norway, 2005, total 12 pages.
Search Report dated Jan. 8, 2014 issued by the European Patent Office in corresponding European Application No. 13181364.4.
Haigh, et al., "Visual Query Language: Finding patterns in and relationships among time series data", Seventh Workshop on Mining Scientific and Engineering Datasets, Apr. 24, 2014, 8 pgs total, XP055094547.
Buono, et al., "Interactive Pattern Search in Time Series", Visualization and Data Analysis 2005, Proceedings of Spie vol. 5669, Mar. 11, 2005, pp. 175-186, XP055094620.
Kam, et al., "Fast Time-Series Searching with Scaling and Shifting", Proceedings of the 18th ACM Sigmod-Sigact-Sigart Symposium on Principles of Database Systems (PODS '99), May 31, 1999, pp. 237-248, XP055094635.
Shatkay, et al., "Approximate Queries and Representations for Large Data Sequences", Proceedings of the 12th International Conference on Date Engineering, Feb. 26, 1996, pp. 536-545, XP010158955.
Perng, et al., "Landmarks: A New Model for Similarity-Based Pattern Querying in Time Series Databases", Proceedings of the 16th International Conference on Data Engineering 2000, Feb. 29, 2000, pp. 33-42, XP010378685.
Wattenberg, "Sketching a Graph to Query a Time-Series Database", CHI '01 Extended Abstracts on Human Factors in Computing Systems, 2001, 3 pgs. total, XP055094632.
Holz, et al., "Relaxed Selection Techniques for Querying Time-Series Graphs", Proceedings of the 22nd Annual ACM Symposium on User Interface Software and Technology (UIST '09), Oct. 4, 2009, pp. 213-222, XP055094615.

* cited by examiner

STATE I

STATE II

STATE III

STATE I

STATE II

STATE III

STATE I

STATE II

STATE III

STATE I

STATE II

STATE III

DATA SIMILARITY CALCULATION METHOD AND DATA SIMILARITY CALCULATION APPARATUS

CROSS-REFERENCE TO RELATED APPLICATION

This application claims priority from Japanese Patent Applications No. 2012-183089, filed on Aug. 22, 2012, the entire contents of which are herein incorporated by reference.

BACKGROUND

1. Technical Field

The present disclosure relates to a waveform similarity calculation method for calculating a similarity between waveforms indicated by time series data. Particularly, the present disclosure relates to a waveform similarity calculation method which can accurately extract time series data substantially similar in waveform.

2. Description of the Related Art

Historical data which are past time series data collected at a certain sample interval from respective portions of a plant are stored in a field control system, a plant information management system, various recorders, etc. These historical data are analyzed and put to use for understanding plant's behavior or improving plant's operation. Particularly, when the same operation has been performed before, the historical data at that time can be referred to for the present operation. The following method can be conceived as a method for extracting the past operation.

(1) A person searches for a date and a time of close operation conditions from a logbook and refers to historical data at that time.

(2) The person views the historical data which are sequentially displayed in a graph, and searches for a close operation part.

(3) The close state is expressed by some kind of conditional expression and retrieved by use of a computer.

3. Citation List

PATENT LITERATURE

1) JP-A-H05-204982
2) JP-A-H06-274193
3) JP-A-2004-348594

NON-PATENT LITERATURE

1) Athanassios Kassidas, John F. MacGregor, Paul A. Taylor (McMaster University), "*Synchronization of Batch Trajectories Using Dynamic Time Warping*", AIChE Journal, Vol. 44, No. 4, 844-875 (1998).

2) DIANTONO C, Makoto TAKAHASHI, Masaharu KITAMURA (Tohoku University), "*Information Retrieval for Intelligent Information Integration in Nuclear Power Plant*", Journal of the Atomic Energy Society of Japan, Vol. 42, No. 11, 1215-1225 (2000).

3) Tetsuya Nakamura et al. (Kobe University), "AMS 5: A *Similarity Measure for Time Series Data*", IEICE Transactions, J91-D(11), pp 2579-2588 (2008).

4) Tomoya FUJINO, Mikihito KANNO, Tatsuji MUNAKA (Mitsubishi Electric Corporation), "*A Method for Similarity-Based Search of Time-Series Sensor Data*", Proceeding of FIT2009, pp 295 (2009).

5) Tomoya FUJINO, Makoto IMAMURA, Mikihito KANNO, Tatsuji MUNAKA (Mitsubishi Electric Corporation), "DIASTRA: *A Method for the Similarity Traversals of Time-Series Data*", DEIM Forum 2011 D9-4 (2011).

However, it is not easy to extract the part where the same operation is performed or the part where the operation to be of use as a reference is performed, from the huge historical data. For example, the aforementioned items (1) and (2) which are performed manually consume great time and labor. About the item (3), there is a method for inputting operation conditions as metadata in a historical trend and retrieving these operation conditions. However, this method also consumes great labor in inputting the metadata. Therefore, it can be conceived that a part similar to some behavior of historical data is retrieved from the historical data by a computer based on some algorithm.

Needs for retrieving a part close to some behavior from historical data have already been perceived. For example, when behavior close to behavior of a plant for several hours till now is found from historical data or a motion close to a target trajectory of an operation from now on is found from the historical data, the behavior or the motion can be of use as a reference for a future operation. As an expression of the behavior of the plant, a "waveform" indicated by the behavior of the historical data for several hours is the target to be retrieved.

Incidentally, since it is seldom that two waveforms are completely consistent with each other, a similar waveform is retrieved. To this end, two waveforms are expressed by vectors. A distance between the vectors is defined. The waveforms having a small distance therebetween are evaluated to be high in similarity. For example, a Euclidean distance can be used as such a distance.

In addition, the similarity may be evaluated based on a correlative coefficient between the two waveforms. In this case, waveforms having a high correlative coefficient are evaluated to be high in similarity.

When the similarity of a waveform is used and a part similar to a certain reference waveform is retrieved from historical data, it is conceived that the following method can be used.

(1) First, historical data of a retrieval target and a reference waveform expressing a waveform to be retrieved are prepared.

(2) The head of the historical data and the head of the reference waveform are made consistent with each other, and a similarity between the two waveforms is calculated.

(3) A part to be extracted from the historical data is shifted backward by a predetermined time, and a similarity between the two waveforms is calculated and stored in the same manner as in the (2). This is repeatedly performed until the end of the historical data.

(4) The stored similarities are sorted, and a time zone with a high similarity to the reference waveform is extracted from the historical data.

This method has the following problems.

(1) There is a case that two resembled waveforms are determined as not similar because they are misaligned with each other as to their absolute values and the similarity therebetween is hence undervalued. In the case where the Euclidean distance is used as the similarity, the misalignment as to the absolute values can be offset by subtracting average values from the absolute values respectively, in the same manner as in the case where the correlative coefficient is used. However, there is a case that a higher similarity can be obtained by fine adjustment of the absolute values.

(2) There is a case that two resembled waveforms whose similarity is undervalued in spite of their similar shapes because one of the waveforms expands or contracts in the direction of the time axis or in the axial direction of absolute values may be determined as not similar. For example, assume that the size of a reference waveform in the direction of the time axis is smaller than that of a waveform in a similar time zone of the historical data. In this case, the state in which the two waveforms are superimposed on each other cannot be obtained, and the similarity between the two waveforms shows a small value. Therefore, the right time zone is not extracted but another time zone substantially not similar to the reference waveform is extracted erroneously.

SUMMARY OF THE INVENTION

One or more aspects of the present invention are to provide a data similarity calculation method which can accurately extract a waveform substantially similar in shape.

According to one or more aspects of the present invention, there is provided a data similarity calculation method. The method includes: (a) acquiring a first waveform; (b) storing time series data; (c) converting the stored time series data into a waveform on two-dimensional coordinates, wherein the two-dimensional coordinates consists of a time axis and an a value axis representing values of the time series data, and the time axis is orthogonal to the value axis; (d) shifting the converted waveform in both directions of the time axis and the value axis so as to generate a second waveform; (e) calculating a similarity between the first waveform and the second waveform; and (f) extracting a shift amount in the direction of the time axis and a shift amount in the direction of the value axis when the similarity is the highest by repeatedly performing steps (d) and (e).

According to one or more aspects of the present invention, step (d) further comprises expanding or contracting the converted waveform in the direction of the value axis, and step (f) further comprises extracting expansion/contraction ratio in the direction of the value axis when the similarity is the highest by repeatedly performing steps (d) and (e).

According to one or more aspects of the present invention, step (d) further comprises expanding or contracting the converted waveform in the direction of the time axis, and step (f) further comprises extracting expansion/contraction ratio in the direction of the time axis when the similarity is the highest by repeatedly performing steps (d) and (e).

According to one or more aspects of the present invention, the second waveform is expressed as a single logarithmic graph or a linear graph.

According to one or more aspects of the present invention, the method further comprises: (g) displaying the first waveform and the second waveform on a screen on the same coordinates.

According to one or more aspects of the present invention, step (a) comprises acquiring the first waveform from the waveform converted in step (c).

According to one or more aspects of the present invention, step (a) comprises acquiring the first waveform from user handwriting operation.

According to one or more aspects of the present invention, step (f) comprises extracting the shift amount in the direction of the time axis and the shift amount in the direction of the value axis when the similarity is higher than a certain degree.

According to one or more aspects of the present invention, there is provided a data similarity calculation apparatus. The apparatus comprises: an receiver configured to receive a first waveform; a storage unit configured to store the time series data; a waveform obtaining unit configured to convert the stored time series data into a waveform on two-dimensional coordinates, wherein the two-dimensional coordinates consists of a time axis and an a value axis representing values of the time series data, and the time axis is orthogonal to the value axis; a waveform generator configured to shift the converted waveform in both directions of the time axis and the value axis so as to generate a second waveform; a similarity calculator configured to calculate a similarity between the first waveform and the second waveform; and an extractor configured to extract a shift amount in the direction of the time axis and a shift amount in the direction of the value axis when the similarity is the highest by repeat operations of the waveform generator and similarity calculator.

BRIEF DESCRIPTION OF DRAWINGS

FIGS. 4A and 4B are views showing how a comparison target waveform is corrected by a waveform generator, wherein FIG. 4A is a graph showing how the comparison target waveform is shifted in a time axis direction, and FIG. 4B is a graph showing how the comparison target waveform is expanded/contracted in the time axis direction;

FIGS. 5A and 5B are views showing how a comparison target waveform is corrected by the waveform generator, wherein FIG. 5A is a graph showing how the comparison target waveform is shifted in a value axis direction orthogonal to the time axis direction, and FIG. 5B is a graph showing how the comparison target waveform is expanded/contracted in the value axis direction;

FIGS. 6A and 6B are views showing specific examples of screen display in a display unit, wherein FIG. 6A shows a state that a comparison target waveform is superimposed on the reference waveform and displayed on the same coordinates as the reference waveform by giving a correction amount to the comparison target waveform to maximize the similarity to the reference waveform, and FIG. 6B shows a state that the comparison target waveform that is not corrected is displayed on the same coordinates as the reference waveform.

DETAILED DESCRIPTION

An embodiment of a data similarity calculation method according to the present invention will be described below.

Figure 1:
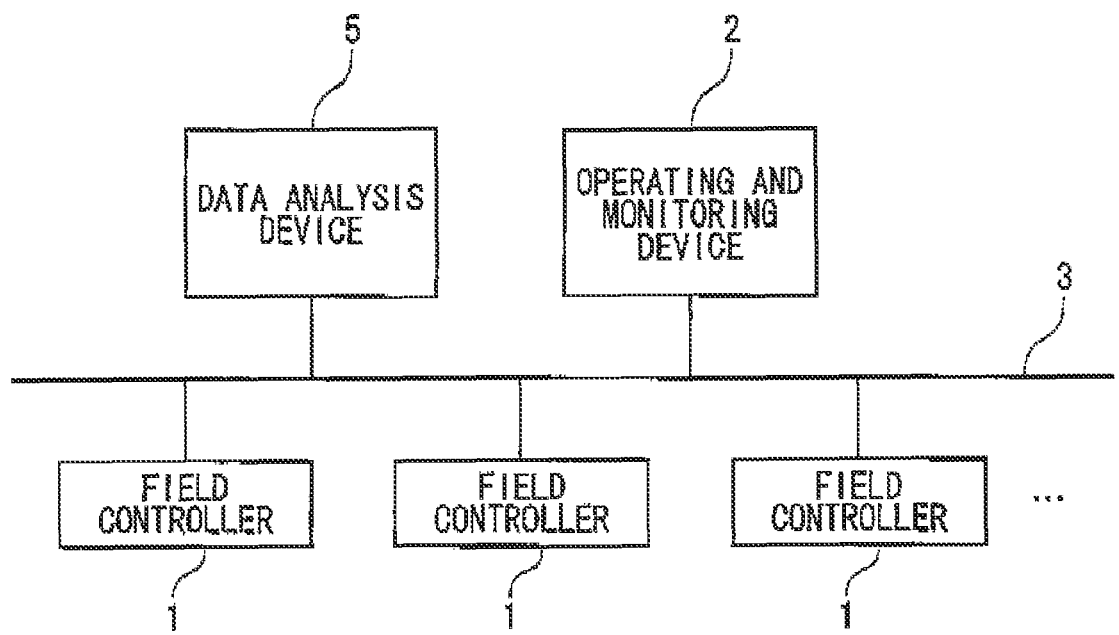
FIG. 1 is a block diagram showing an example of the configuration of a field controller to which a data similarity calculation method according to the invention is applied.
Figure 2:
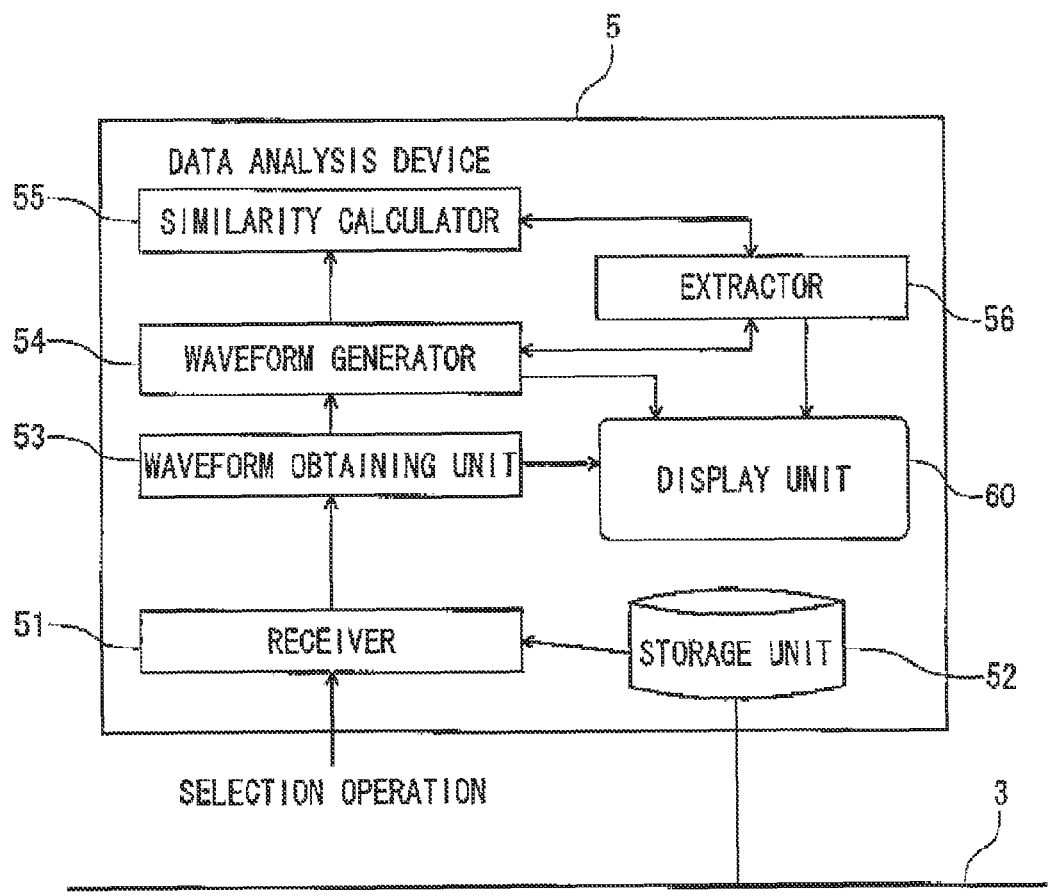
FIG. 2 is a block diagram showing the configuration of a data analysis device.

FIG. 1 is a block diagram showing an example of the configuration of a field controller to which a data similarity calculation method according to the invention is applied. FIG. 2 is a block diagram showing the configuration of a data analysis device which executes the data similarity calculation method according to the invention.

As shown in FIG. 1, the field controller includes field controllers 1 which are dispersed in a plant, and an operating and monitoring device 2 which operates and monitors a field device group (not shown) through the field controllers 1. The field controllers 1 and the operating and monitoring device 2 are connected to each other through a communication line 3.

A data analysis device 5 which executes the data similarity calculation method according to the invention is connected to the communication line 3. A similar function to that of the data analysis device 5 may be provided in the operating and monitoring device 2, instead of the data analysis device 5.

As shown in FIG. 2, the data analysis device 5 includes a receiver 51 which receives selection of a reference waveform as a first waveform, a storage unit 52 which stores time series data, a waveform obtaining unit 53 which converts the time series data stored by the storage unit 52 into a waveform on two-dimensional coordinates consisting of a time axis and a value axis indicating values of the time series data (hereinafter referred to as "the value axis"), a waveform generator 54 which generates a second waveform by correcting the waveform acquired by the waveform obtaining unit 53 (for example, by shifting the acquired waveform in the time axis and shifting the acquired waveform in the value axis), a similarity calculator 55 which calculates a similarity between the reference waveform selected by the receiver 51 and the second waveform generated by the waveform generator 54, and an extractor 56 which extracts a combination of a shift amount in the time axis and a shift amount in the value axis when the similarity is increased by repeat operations of the waveform generator 54 and the similarity calculator 55. In addition, a display unit 60 which displays the waveform generated by the waveform generator 54, the waveform based on an extraction result by the extractor 56 or the like on a screen is provided in the data analysis device 5.

Operation of the data analysis device 5 will be described below.

Process data, setting values or other time series data are sequentially acquired and stored in the storage unit 52 through the communication line 3. The storage unit 52 can acquire data exchanged between the operating and monitoring device 2 and each field controller 1 through the communication line 3, data exchanged among the field controllers 1 through the communication line 3 and can acquire various kinds of time series data stored in the operating and monitoring device 2 or the field controller 1 through the communication line 3.

The time series data stored in the storage unit 52 are converted into a waveform on two-dimensional coordinates consisting of a time axis and an value axis indicating values of the time serious data by the waveform obtaining unit 53. The waveform can be displayed on the screen in the display unit 60. An operation for screen display of the waveform in the display unit 60 is similar to that in a related art device which displays the waveform on a screen. For example, a trend graph of specific time series data in a necessary time zone can be shown on the screen by scroll operation in the direction of the time axis. In addition, the waveform acquired by the waveform obtaining unit 53 can be displayed on the screen in the display unit 60 after being processed by the waveform generator 54.

The waveform generator 54 is configured to shift the acquired waveform in the time axis, shift the acquired waveform in the value axis, expand/contract the acquired waveform in the direction of the time axis, and expand/contract the acquired waveform in the direction of the value axis. In the specification, these processes are also referred to as "correction" on the waveform.

In the data similarity calculation method according to the embodiment, a reference waveform selected by a user and a comparison target waveform indicated by the time series data stored in the storage unit 52 are compared with each other, and the time series data indicating the comparison target waveform similar to the reference waveform are retrieved. In retrieving the time series data, the head of the reference waveform is first aligned with the head of the comparison target waveform. Then, a shift amount in the direction of the value axis of the comparison target waveform, an expansion/contraction ratio of the comparison target waveform in a direction of the absolute values, and an expansion/contraction ratio of the comparison target waveform in a direction of the value axis are adjusted little by little. Then, a highest similarity and correction amounts at the time of the highest similarity (the shift amount of the absolute value, the expansion/contraction ratio in the direction of the value axis, and the expansion/contraction amount in the direction of the time axis, at that time) are stored.

Next, the head of the comparison target waveform is shifted by a predetermined time, and correction amounts at the time of a highest similarity (a shift amount in the direction of the value axis, an expansion/contraction ratio in the direction of the value axis, an expansion/contraction amount in the direction of the time axis and a shift amount in the direction of the time axis, at that time) are stored in the same manner. Then, while the head of the comparison target waveform is shifted by a predetermined time, the same processing is repeatedly performed until the end of the comparison target waveform. Finally, similarities are sorted, and a predetermined number (k) of waveforms are extracted in a descending order.

Figure 3:
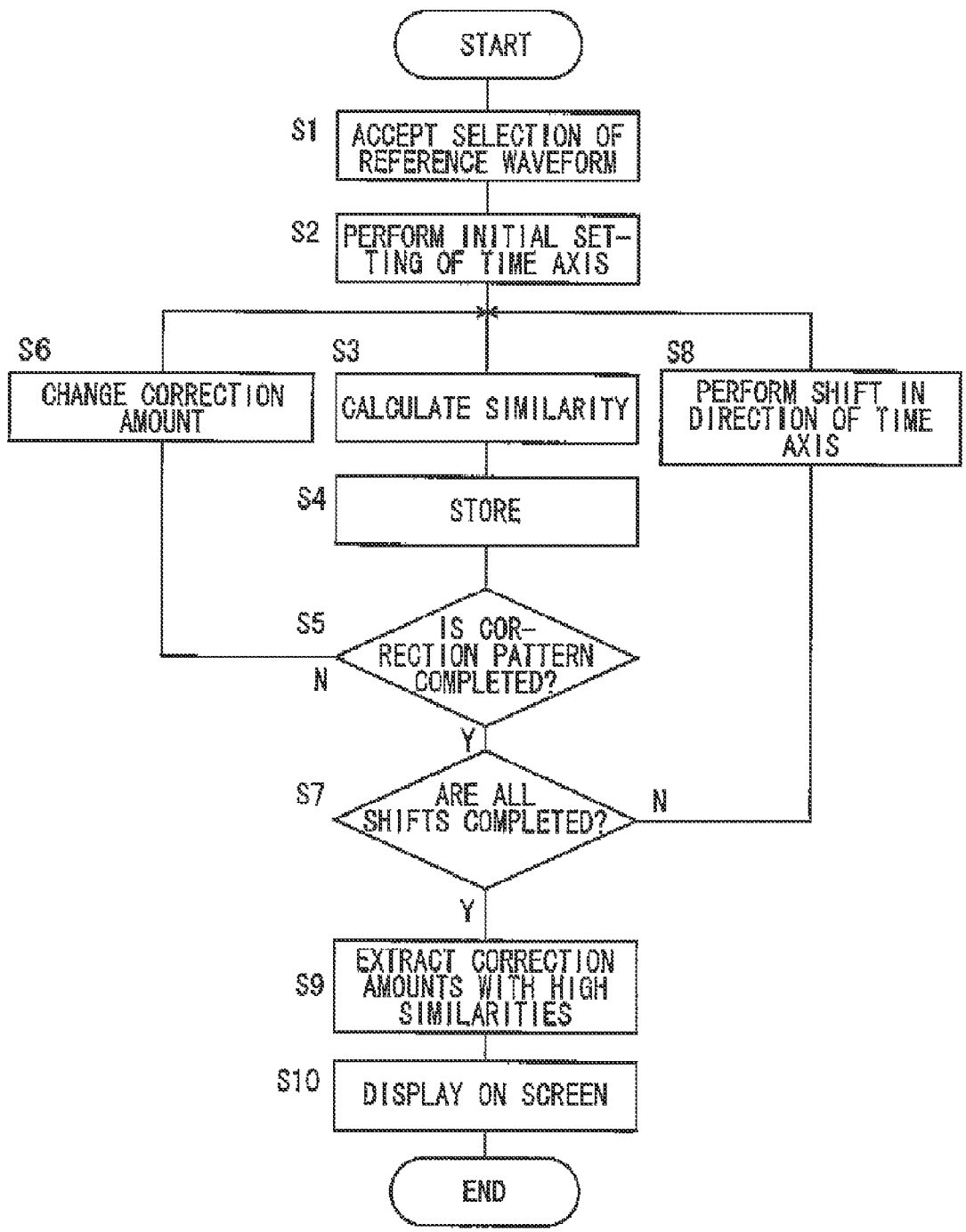
FIG. 3 is a flow chart showing a similarity calculation procedure carried out by the data analysis device 5.

FIG. 3 is a flow chart showing a similarity calculation procedure performed by the data analysis device 5. In this procedure, normally, comparison of waveforms is aimed at extraction of a near-identical case as to the status change or operation condition of a process. Therefore, a waveform based on time series data belonging to the same kind as the reference waveform or a waveform based on time series data similar to the reference waveform serves as the comparison target waveform. In an operation in FIG. 3, assume that the data type (for example, specific process data) of the time series data corresponding to the comparison target waveform is specified in advance.

In step S1 in FIG. 3, selection of a reference waveform in accordance with a user's selection operation is accepted by the receiver 51. Here, the user designates predetermined time series data from time series data stored in the storage unit 52 so that the user can select a waveform corresponding to the predetermined time series data as a reference waveform. In this case, the user displays a waveform acquired by the waveform obtaining unit 53 in the display unit 60 so that the user can easily confirm the time series data to be designated. For example, configuration may be made in such a manner that a waveform corresponding to the time series data is displayed on the screen of the display unit 60 so that the user can select the waveform by an operation on the screen. With such a method, for example, the user can designate time series data corresponding to a waveform to be targeted, easily from historical data (time series data) stored in the storage unit 52.

In addition, the user can input the reference waveform in handwriting by an operation on an input device such as a touch panel. In this case, a waveform inputted in handwriting is selected as the reference waveform. For example, the user can input the waveform to be targeted, directly in handwriting. When a touch panel or the like is provided on the display screen of the display unit 60, the user can input a waveform while referring to another waveform displayed on the display screen of the display unit 60. For example, when a target curve following a trend graph so far displayed on the display screen of the display unit 60 is written on the display screen, the target curve can be inputted as the reference waveform.

Next, in step S2 in FIG. 3, the head of the reference waveform is aligned with the head of the comparison target waveform by the waveform obtaining unit 53 and the waveform generator 54. In addition, the correction amount by the waveform generator 54 (that is, the shift amount in the value axis, the expansion/contraction in a direction of the value axis, and the expansion/contraction in the direction of the value axis) is set as initial values.

Next, in step S3, a similarity between the reference waveform and the comparison target waveform is calculated by the similarity calculator 55. The similarity calculator 55 expresses the two waveforms in vectors, defines a distance between the vectors, and evaluates that the similarity is higher when the distance is smaller. For example, the following Euclidean distance can be used as the distance.

First, the reference waveform is expressed as n samples x(1) to x(n) and the comparison target waveform is expressed as n samples y(1) to y(n). On this occasion, the Euclidean distance between the reference waveform and the comparison target waveform is expressed as in Expression (1).

$$\text{Euclidean Distance} = \sqrt{\sum_{i=1}^{n}(x(i)-y(i))^2} \quad (1)$$

Next, in step S4, the Euclidean distance calculated in the step S3, and correction amounts made by the waveform generator 5 (that is, a shift amount of the comparison target waveform in the time axis, a shift amount of the comparison target waveform in the value axis, an expansion/contraction ratio of the comparison target waveform in the direction of the value axis and an expansion/contraction ratio of the comparison target waveform in the direction of the time axis) are stored.

A correlative coefficient may be used instead of the Euclidean distance for calculation of the similarity. In this case, the similarity is evaluated as higher when the correlative coefficient is smaller. When the reference waveform is expressed as n samples x(1) to x(n) and the comparison target waveform is expressed as n samples y(1) to y(n), the correlative coefficient between the reference waveform and the comparison target waveform is expressed as in Expression (2).

$$\text{Correlative Coefficient} = \frac{\sum_{i=1}^{n}(x(i)-\bar{x})(y(i)-\bar{y})}{\sqrt{\sum_{i=1}^{n}(x(i)-\bar{x})^2}\sqrt{\sum_{i=1}^{n}(y(i)-\bar{y})^2}}, \quad (2)$$

where $\bar{x}$ and $\bar{y}$ represent averages of x and y respectively.

Next, in step S5, determination is made as to whether all combinations of the correction amounts (that is, the expansion/contraction in the direction of the time axis, the shift amount in the value axis, the expansion/contraction in the direction of the value axis) are completed or not. When the determination is positive, the procedure goes to step S7. To the contrary, when the determination is negative, the procedure goes to step S6.

In the step S6, the correction amounts made by the waveform generator 54 are changed. Then, the procedure goes to the step S3. In the step S6, a correction amount of at least one of an expansion/contraction ratio in the direction of the time axis, the shift amount in the value axis and an expansion/contraction ratio in the direction of the value axis is changed by the waveform generator 54.

On the other hand, in the step S7, determination is made as to whether the shift in the direction of the time axis made by the waveform generator 54 is completed or not. When the determination is positive, the procedure goes to step S9. To the contrary, when the determination is negative, the procedure goes to step S8. In the step S7, the determination is positive when processing in the steps S3 to S5 is terminated up to the end of the comparison target waveform.

In the step S8, the shift by a predetermined amount in the direction of the time axis is executed by the waveform generator 54, and the correction amounts (that is, the expansion/contraction in the direction of the value axis, the shift in the value axis, and the expansion/contraction in the direction of the value axis) are set as the initial values. Then, the procedure returns to the step S3.

On the other hand, in the step S9, the similarities stored in the step S4 are sorted and combinations of correction amounts (that is, the shift amount in the value axis, the expansion/contraction ratio in the direction of the value axis, the expansion/contraction amount in the direction of the time axis, and the shift amount in the direction of the time axis) of waveforms with the highest similarities are extracted by the extractor 56 (see FIG. 2). Here, k correction amounts are extracted, for example, in a descending order of similarity.

Next, in step S10, the reference waveform and the comparison waveform extracted by the extractor 56 are displayed on the screen in the display unit 60 (see FIG. 2). Specific examples of the screen display will be described later.

FIGS. 4A and 4B and FIGS. 5A and 5B are graphs showing how the comparison target waveform is corrected by the waveform generator 54. In FIGS. 4A and 4B and FIGS. 5A and 5B, a solid line 61 represents the reference waveform and a broken line 62 represents the comparison target waveform.

Figure 4A:
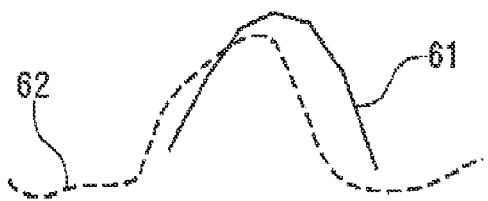
Figure 4A:
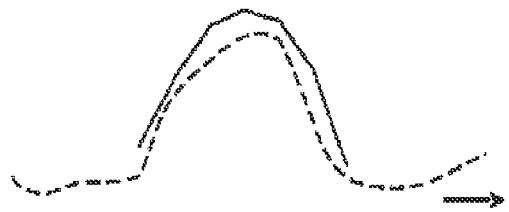
Figure 4A:
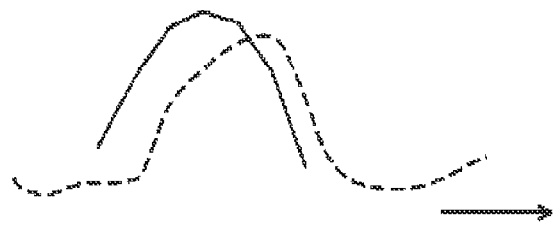

FIG. 4A shows how the comparison target waveform is shifted in the direction of the time axis. In FIG. 4A, the comparison target waveform which is represented by the broken line 62 and is shifted sequentially in the direction of the time axis (rightward) are displayed in a sequence of state I, state II and state III.

Figure 4B:
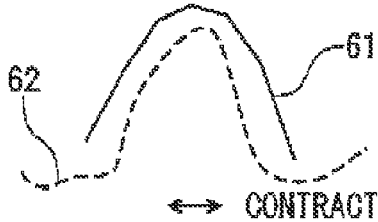
Figure 4B:
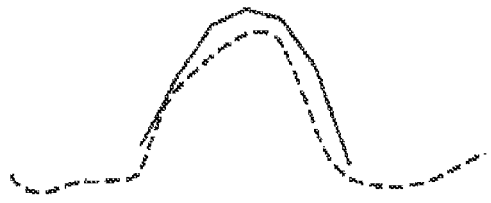
Figure 4B:
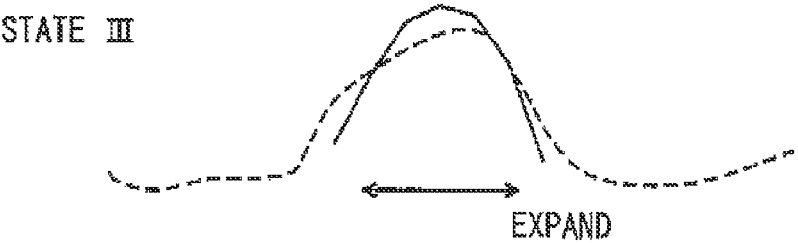

FIG. 4B shows how the comparison target waveform is expanded or contracted in the direction of the time axis. In FIG. 4B, the comparison target waveform which is represented by the broken line 62 and is expanded sequentially in the direction of the time axis (leftward/rightward) are displayed in a sequence of state I, state II and state III. In FIG. 4B, the state I represents a state in which the comparison target waveform is contracted in the direction of the time axis in comparison with the state II, and the state III represents a state in which the comparison target waveform is expanded in the direction of the time axis in comparison with the state II.

Figure 5A:
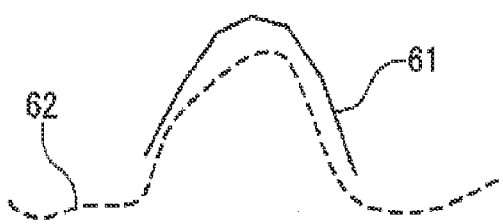
Figure 5A:
Figure 5A:
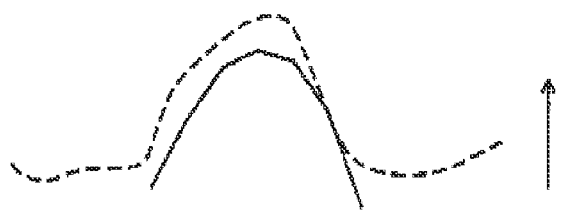

FIG. 5A shows how the comparison target waveform is shifted in the direction of the value axis. In FIG. 5A, the comparison target waveform which is represented by the broken line 62 and is shifted sequentially in the direction of the value axis (upward) are displayed in a sequence of state I, state II and state III.

Figure 5B:
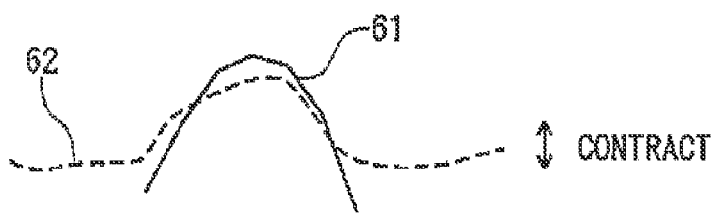
Figure 5B:
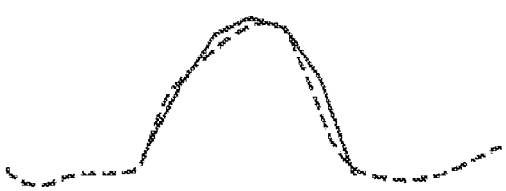
Figure 5B:
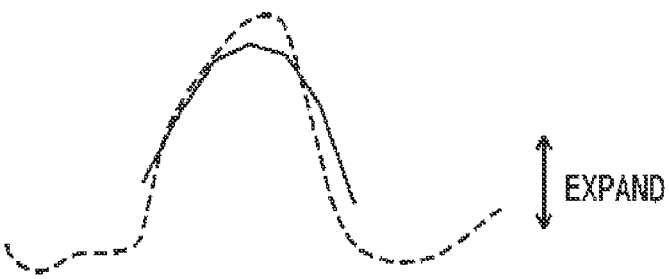

FIG. 5B shows how the comparison target waveform is expanded or contracted in the direction of the value axis. In FIG. 5B, the comparison target waveform which is represented by the broken line 62 and is expanded sequentially in the direction of the value axis (upward/downward) are displayed in a sequence of state I, state II and state III. In FIG. 5B, the state I represents a state in which the comparison target waveform is contracted in the direction of the value axis in comparison with the state II, and the state III represents a state in which the comparison target waveform is expanded in the direction of the value axis in comparison with the state II.

In the data similarity calculation method according to the present embodiment, correction amounts with which the comparison target waveform can be made most similar to the reference waveform are extracted in combination of the shift and expansion/contraction in the directions of the two axes as shown in FIGS. 4A and 4B and FIGS. 5A and 5B. Therefore, a high similarity between two waveforms resembled in shape can be obtained in spite of misalignment in phase, difference in base value or slight difference in magnitude in the direction of the time axis. Accordingly, it is possible to surely extract a comparison target waveform substantially similar to the reference waveform. In this manner, a portion similar to the reference waveform can be retrieved more flexibly from historical data.

For example, the influence of a change in flow rate or a change rate in temperature caused by a variation in volume among containers existing in a plant can be eliminated by the expansion/contraction in the direction of the time axis so that a substantially similar comparison target waveform can be surely extracted. For example, it can be therefore conceived that a change in production amount or tank volume during the operation of the plant leads to a change in a base value of a process amount or a change in time taken for the change. Even in such a case, a similarity of a waveform unique to the plant or operation can be retrieved surely. In addition, as for a time series variation of pressure, the rate of the pressure may be regarded as a problem rather than the absolute value thereof. In this case, a comparison target waveform substantially similar to the reference waveform can be extracted surely by the expansion/contraction in a direction of an axis indicating the values of the pressure.

In addition, the combination of the shift and expansion/contraction of a comparison target waveform in the direction of the value axis may obtains an effect that the comparison target waveform similar to the reference waveform can be extracted surely without consideration of characteristics of the data type of the time series data or the way to take coordinates on the screen of the display unit 60. For example, some data kind of time series data may be displayed in a linear trend graph or a logarithmic trend graph (single logarithmic trend graph). Even when those trend graphs are mixed, a similar waveform can be surely extracted without awareness of the display form. In addition, for example, there is a possibility that an effective correction method for finding out a similarity between waveforms varies due to the way to take the origin in coordinates even in the linear display. However, according to the present embodiment, by combination of the shift and expansion/contraction of a comparison target waveform in the direction of the value axis, the comparison target waveform similar to the reference waveform can be surely extracted regardless of the data type of the time series data or the display form of the trend graph.

Figure 6A:
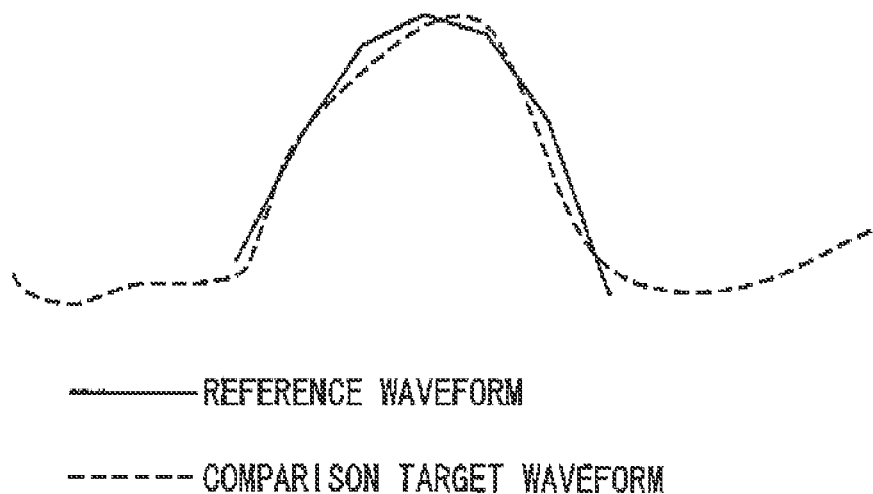
Figure 6B:
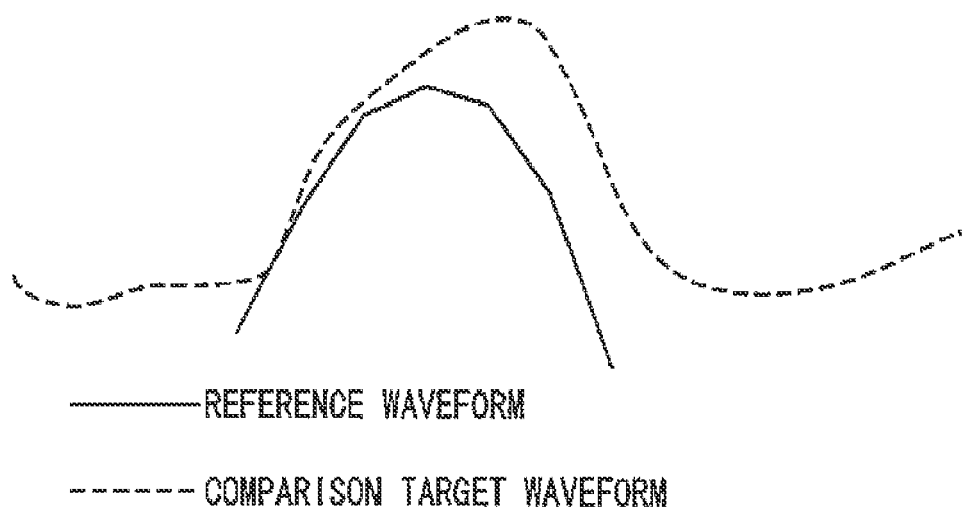

FIGS. 6A and 6B are graphs showing specific examples of the screen display in the display unit 60.

As described above, the reference waveform and the comparison target waveform are displayed on the screen in the step S10 (see FIG. 3). In the embodiment, the display form of the comparison target waveform can be switched. The display form can be selected by a user.

FIG. 6A shows a state that a comparison target waveform is superimposed on the reference waveform and displayed on the same coordinates as the reference waveform by giving a correction amount to the comparison target waveform to maximize the similarity to the reference waveform. Correction amounts extracted in the step S9 (see FIG. 3) are used as the correction amounts.

FIG. 6B shows a state that the comparison target waveform that is not corrected is displayed on the same coordinates as the reference waveform. In this case, in order to display the comparison target waveform on the same screen as the reference waveform, a correction amount (that is, the shift in the direction of the time axis, with which the similarity of the comparison target waveform to the reference waveform can be made the highest) may be given while the other correction amounts are zero.

Incidentally, an example for display of only one comparison target waveform is shown in FIGS. 6A and 6B. However, a plurality of waveforms corresponding to a plurality of correction amounts extracted by the extractor 56 (see FIG. 2) may be displayed simultaneously. In addition, any waveform may be selected as a display target from the plurality of waveforms. The comparison target waveform displayed on the screen may be selected by the user.

When the display form of the comparison target waveform can be changed over in this manner, the user can easily grasp what correction can obtain a comparison target waveform close to the reference waveform, and the user can also apply another analysis to the similarity obtained by calculation. Thus, for example, the waveform corresponding to the reference waveform can be specified more accurately.

According to the above description, the combination of four kinds of correction made by the waveform generator 54 (that is, the combination of the shift in a direction of the time axis, the expansion/contraction in the direction of the time axis, the shift in a direction of the value axis, and the expansion/contraction in the direction of the value axis) has been described in the embodiment. Only part of these correction methods may be combined and the way of the combination is optional. For example, two kinds of correction methods such as the shift in the direction of the time axis and the shift in the direction of the value axis may be combined, or three kinds of correction methods such as the shift in the direction of the time axis, the expansion/contraction in the direction of the time axis and the shift in the direction of the value axis may be combined.

Moreover, in the case where the data type of the time series data and the display form in the display unit 60 are recognized and valid/invalid correction methods corresponding to the data type and the display form can be recognized in advance, correction methods performed by the waveform generator 54 may be narrowed down in accordance with the data type and the display form respectively.

In addition, when a lot of abnormal values or noises are included in the time series data stored by the storage unit 52 (FIG. 2) due to a failure of a sensor, lack of values caused by calibration or communication errors, etc., it is likely that the influence of these on the value of a similarity is so great that the similarity cannot be digitalized correctly. In order to avoid this possibility, pre-processing for eliminating the abnormal values from the time series data or reducing noise components by filter processing may be performed.

In addition, the value of the Euclidean distance may be normalized when the similarity is calculated. In this case, any well-known method may be used widely. For example, normalization may be performed so that the variance between two waveforms or the maximum to minimum ratio in each of the two waveforms can be set at 1.

As described above, according to the data similarity calculation method in the embodiment, a similarity is calculated for each comparison target waveform while adding correction thereof, so that a comparison target waveform similar to a reference waveform can be extracted surely. Therefore, even when there is a change in condition during operation of a plant, the comparison target waveform similar to the reference waveform can be surely extracted regardless of the data type of time series data and the display form of a trend graph.

Embodiments of the present invention include various operations, which will be described below. The operations associated with embodiments of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

Embodiments of the present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, embodiments of the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

According to the present embodiment, the data analysis device 5 may includes a processor and a memory. For example, the memory may serve as the storage unit 52 shown in FIG. 2, and the processor may serve as the receiver 51, the waveform obtaining unit 53, the waveform generator 54, the similarity calculator 55, and the extractor 56. In other words, the memory may be configured to store time series data, and the processor may be configured to (a) acquire a first waveform; (b) store time series data; (c) convert the stored time series data into a waveform on two-dimensional coordinates, wherein the two-dimensional coordinates consists of a time axis and an a value axis representing values of the time series data, and the time axis is orthogonal to the value axis; (d) shift the converted waveform in both directions of the time axis and the value axis so as to generate a second waveform; (e) calculate a similarity between the first waveform and the second waveform; and (f) extract a shift amount in the direction of the time axis and a shift amount in the direction of the value axis when the similarity is the highest by repeatedly performing steps (d) and (e).

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A data similarity calculation method comprising:
(a) acquiring a first waveform;
(b) storing time series data;
(c) converting the stored time series data into a waveform on two-dimensional coordinates, wherein the two-dimensional coordinates consists of a time axis and an a value axis representing values of the time series data, and the time axis is orthogonal to the value axis;
(d) shifting the converted waveform in both directions of the time axis and the value axis so as to generate a second waveform;
(e) calculating a similarity between the first waveform and the second waveform; and
(f) extracting a shift amount in the direction of the time axis and a shift amount in the direction of the value axis when the similarity is the highest by repeatedly performing steps (d) and (e).

2. The method of claim 1, wherein
step (d) further comprises expanding or contracting the converted waveform in the direction of the value axis, and
step (f) further comprises extracting expansion/contraction ratio in the direction of the value axis when the similarity is the highest by repeatedly performing steps (d) and (e).

3. The method of claim 1, wherein
step (d) further comprises expanding or contracting the converted waveform in the direction of the time axis, and
step (f) further comprises extracting expansion/contraction ratio in the direction of the time axis when the similarity is the highest by repeatedly performing steps (d) and (e).

4. The method of claim 2, wherein the second waveform is expressed as a single logarithmic graph or a linear graph.

5. The method of claim 1, further comprising:
(g) displaying the first waveform and the second waveform on a screen on the same coordinates.

6. The method of claim 1, wherein step (a) comprises acquiring the first waveform from the waveform converted in step (c).

7. The method of claim 1, wherein step (a) comprises acquiring the first waveform from user handwriting operation.

8. The method of claim 1, wherein step (f) comprises extracting the shift amount in the direction of the time axis and the shift amount in the direction of the value axis when the similarity is higher than a certain degree.

9. A data similarity calculation apparatus comprising:
an receiver configured to receive a first waveform;
a storage unit configured to store the time series data;
a waveform obtaining unit configured to convert the stored time series data into a waveform on two-dimensional coordinates, wherein the two-dimensional coordinates consists of a time axis and an a value axis representing values of the time series data, and the time axis is orthogonal to the value axis;
a waveform generator configured to shift the converted waveform in both directions of the time axis and the value axis so as to generate a second waveform;
a similarity calculator configured to calculate a similarity between the first waveform and the second waveform; and
an extractor configured to extract a shift amount in the direction of the time axis and a shift amount in the direction of the value axis when the similarity is the highest by repeat operations of the waveform generator and similarity calculator.

* * * * *